(12) United States Patent
Mandel

(10) Patent No.: US 12,294,259 B1
(45) Date of Patent: May 6, 2025

(54) ELECTRO-MAGNETIC GENERATOR WITH PENDULUM STRUCTURE FOR CONVERTING KINETIC ENERGY TO ELECTRICAL ENERGY

(71) Applicant: George Mandel, Danville, CA (US)

(72) Inventor: George Mandel, Danville, CA (US)

( * ) Notice: Subject to any disclaimer, the term of this patent is extended or adjusted under 35 U.S.C. 154(b) by 0 days.

(21) Appl. No.: 18/884,791

(22) Filed: Sep. 13, 2024

(51) Int. Cl.
*H02K 17/42* (2006.01)
*H02K 1/34* (2006.01)
*H02K 5/173* (2006.01)
*H02K 11/05* (2016.01)

(52) U.S. Cl.
CPC ............. *H02K 17/42* (2013.01); *H02K 1/34* (2013.01); *H02K 5/173* (2013.01); *H02K 11/05* (2016.01)

(58) Field of Classification Search
CPC .......... H02K 1/34; H02K 5/173; H02K 11/05; H02K 17/42
USPC ....................................................... 310/171
See application file for complete search history.

(56) References Cited

U.S. PATENT DOCUMENTS

| 4,463,866 A * | 8/1984 | Mandel | B65D 17/4014 |
| | | | 220/269 |
| 4,726,627 A * | 2/1988 | Frait | B60T 17/20 |
| | | | 73/514.31 |
| 2011/0127914 A1* | 6/2011 | Patton | F21V 17/10 |
| | | | 362/249.06 |
| 2020/0018281 A1* | 1/2020 | Sincock | F03B 13/20 |

* cited by examiner

*Primary Examiner* — Rashad H Johnson
(74) *Attorney, Agent, or Firm* — Imperium Patent Works LLP; Mark D. Marrello

(57) ABSTRACT

An electro-magnetic generator is disclosed, comprising a housing containing an arched array of metal coils and a magnet connected to a inverted pendulum. The inverted pendulum is configured to move the magnet relative to the bottom surface of the arched array of metal coils, generating an electrical current in one or more of the metal coils through electromagnetic induction. Each coil in the array includes a first terminal and a second terminal for electrical output. The generator further includes a plurality of current rectifier circuits, each connected to the first and second terminals of the respective metal coils, ensuring that the output current flows in a unified direction. The outputs from the rectifier circuits are summed together to create a combined current, which is routed to a battery terminal for storage. A voltage regulator is connected to the battery terminal to stabilize the electrical output.

20 Claims, 14 Drawing Sheets

ELECTRO-MECHANICAL GENERATOR SYSTEM

ELECTRO-MECHANICAL GENERATOR SYSTEM

ELECTRO-MECHANICAL GENERATOR SYSTEM

UNIVERSAL JOINT
TOP-DOWN VIEW

TOP-DOWN VIEW COIL ARRAY WITH MAGNET STOPPER

BOTTOM-UP VIEW MAGNET ARRAY WITH STOPPER

CURRENT RECTIFIER SCHEMATIC

SYSTEM ELECTRICAL DIAGRAM

MAGNET RANGE OF MOTION

SHIP E-M GENERATOR IMPLEMENTATION

ACCESS DOORS

FLOWCHART

ELECTRO-MECHANICAL GENERATOR SYSTEM

ELECTRONIC CONTROL SYSTEM

TOP-DOWN VIEW
UNIVERSAL JOINT PLATFORM

SIDE VIEW
UNIVERSAL JOINT PLATFORM

ELECTRO-MAGNETIC GENERATOR WITH PENDULUM STRUCTURE FOR CONVERTING KINETIC ENERGY TO ELECTRICAL ENERGY

TECHNICAL FIELD

The present invention generally relates to systems and methods for electro-mechanical energy generation. More specifically, the present invention relates to new systems and methods for an electro-mechanical energy generator that converts kinetic energy into electrical energy.

BACKGROUND INFORMATION

The history and evolution of electric energy generators trace the development of devices that convert mechanical energy into electrical energy, powering much of modern life. The foundation of electric generators lies in early scientific exploration, beginning with William Gilbert's studies on magnetism and electricity in the 1600s, and culminating in the 18th-century work of figures like Benjamin Franklin, who demonstrated the connection between lightning and electricity. However, it was Alessandro Volta's development of the Voltaic Pile in 1800, the first chemical battery capable of producing a continuous electrical current, that laid the groundwork for more advanced devices.

The true breakthrough in electric generators came in 1831 with Michael Faraday's discovery of electromagnetic induction. Faraday demonstrated that moving a conductor through a magnetic field could generate an electric current, paving the way for modern electric generators. His device, known as the Faraday Disk, was a simple generator that produced direct current (DC) and marked the birth of the dynamo, the precursor to modern generators. Early dynamos were inefficient, but over the next few decades, engineers like Hippolyte Pixii, Werner von Siemens, and Charles Wheatstone made significant improvements, eventually leading to the development of the Zénobe Gramme dynamo in 1870, which produced continuous direct current for industrial applications.

The late 19th century saw a major debate over the best method of electricity transmission: direct current (DC), championed by Thomas Edison, or alternating current (AC), supported by Nikola Tesla and George Westinghouse. Edison's DC systems were used in the first public power stations, but they had limitations in transmitting electricity over long distances. Tesla's invention of the AC induction motor and transformers allowed alternating current to be transmitted efficiently over greater distances, leading to the success of the Niagara Falls Power Project in 1895, which established AC power as the dominant form of electricity distribution.

In the 20th century, electricity generation shifted from small, isolated generators to large-scale power plants capable of supplying entire regions. Steam turbines, invented by Charles Parsons in 1884, became the preferred method for driving generators in power plants due to their efficiency. Hydroelectric power also rose to prominence, with projects like the Hoover Dam using turbines to convert the kinetic energy of falling water into electricity. Fossil fuels such as coal, natural gas, and oil powered thermal plants, while nuclear reactors, developed in the 1950s, provided a new source of heat to drive turbines in nuclear power plants.

The late 20th and early 21st centuries saw a growing emphasis on renewable energy technologies due to concerns over fossil fuel depletion and environmental impact. Wind turbines, using modern technology to convert wind into electricity, and photovoltaic solar panels, which directly convert sunlight into electricity, became increasingly important sources of power. Geothermal energy, tapping into heat from the Earth's core, and large-scale battery storage systems, which help manage intermittent renewable energy sources, also began to play a significant role in the energy landscape. Advances in hydrogen fuel cells and superconducting materials continue to push the boundaries of energy generation, offering cleaner and more efficient alternatives to traditional methods.

Today, the development of electric energy generators focuses on increasing efficiency, sustainability, and integration with modern grids. Research into hydrogen fuel cells, superconducting generators, and renewable energy sources promises to revolutionize the way electricity is produced and consumed. The evolution of electric energy generators, from Faraday's early experiments to modern renewable technologies, reflects a journey of scientific discovery, technological innovation, and societal adaptation, shaping industrial progress and driving the future of energy production.

While the above mentioned evolution has greatly improved electric energy generation technology, there is a need for a new and improved electric energy generation system.

SUMMARY

In a first novel aspect, An electro-magnetic generator comprises a housing; an arched array of metal coils disposed within the housing; and a magnet connected to an inverted pendulum, the inverted pendulum configured to move the magnet about the bottom surface of the arched array of metal coils. The movement of the magnet relative to the arched array of metal coils generates an electrical current in one or more of the metal coils.

In a second novel aspect, the output of each coil in the arched array of metal coils includes a first terminal, a second terminal and a plurality of current rectifier circuits, where each rectifier circuit is connected the first terminal and second terminal of one of the metal coils.

In a third novel aspect, the output of each current rectifier circuit is summed together.

In a fourth novel aspect, the summed current is coupled to an energy storage device terminal.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
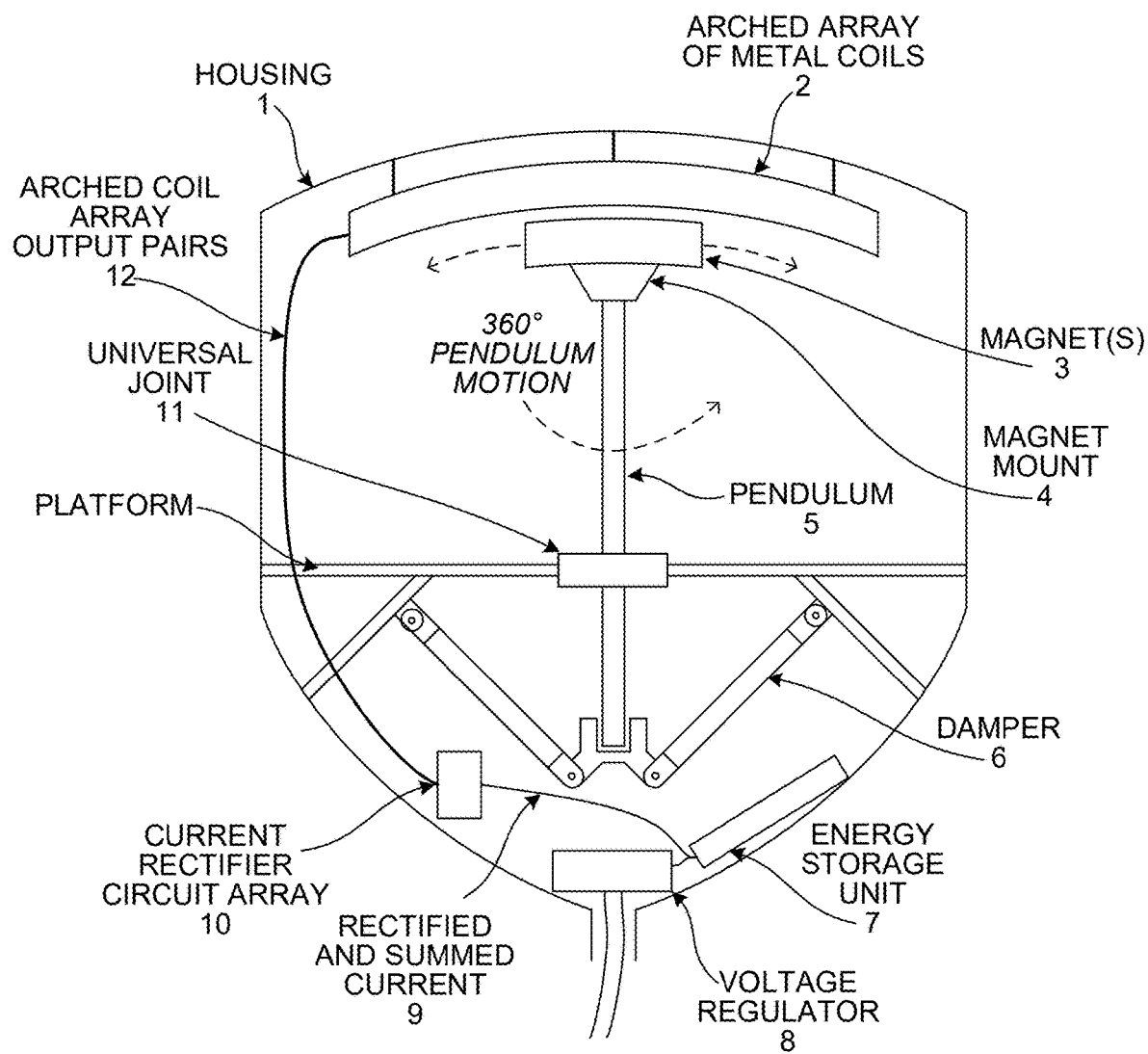
FIG. 1 is a diagram illustrating a new electro-mechanical generator system.

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

A new electro-mechanical generator solution is urgently needed to address the growing demand for consistent, efficient, and renewable electricity generation in today's energy landscape. As the global population increases and industries expand, traditional methods of electricity generation, such as fossil fuel-based power plants, are proving unsustainable due to their environmental impact and reliance on finite resources. Fossil fuels contribute significantly to greenhouse gas emissions, accelerating climate change, and leading to harmful effects on ecosystems and human health. Moreover, these resources are depleting, resulting in rising energy costs and geopolitical tensions. While renewable energy sources like solar, wind, and hydropower offer promising alternatives, they often suffer from intermittent availability, making it difficult to ensure a consistent energy supply. For example, solar power is dependent on daylight and weather conditions, while wind energy is contingent on wind patterns, which can be unpredictable.

A new electro-mechanical generator solution can overcome these challenges by integrating innovative technologies designed for greater energy efficiency, storage capabilities, and adaptability to renewable resources. This next-generation solution would focus on maximizing the conversion of mechanical energy into electrical energy with minimal energy loss, a key factor in improving overall system efficiency. Current generator designs often experience inefficiencies due to resistance, friction, or mechanical limitations, leading to wasted energy and higher operational costs. By utilizing advanced materials, more precise engineering, and smart control systems, a new generator could significantly reduce these losses and enhance the efficiency of energy production.

Furthermore, this new solution should be designed to operate seamlessly with renewable energy sources, providing a more reliable and stable power output. One of the major drawbacks of renewable energy is its variability, but an advanced electro-mechanical generator, potentially coupled with energy storage systems like batteries or supercapacitors, can help buffer these fluctuations and ensure a continuous supply of electricity. For instance, a generator equipped with flywheel technology or advanced turbines could store excess energy during peak production times and release it when renewable sources are not generating power, ensuring grid stability.

Finally, the emphasis on sustainability makes it imperative to develop a generator that not only supports renewable energy integration but also minimizes environmental impact. This would involve reducing the use of hazardous materials in construction, enhancing the lifespan of the generator through durable and recyclable components, and improving its overall energy footprint. By developing a new electro-mechanical generator that addresses the limitations of current systems, we can create a more sustainable energy future, reducing dependence on fossil fuels and enabling the widespread adoption of renewable energy, all while ensuring that electricity is generated in a consistent, efficient, and environmentally friendly manner.

Turning gravitational energy into kinetic energy to generate electricity. A slight random motion of the wave generators will activate the spherical shaped magnet creating a multi direction moving reaction to engage with the above placed magnetic without the use of bearing generating electric currents. The position of the stator and magnet can be reversed. The radial (hyperbolic) shaped magnet faces a radial (parabolic) shaped magnet. A shaft connects the magnet to a universal joint with the ball bearings. The stator and magnet radius are determined by the distance of the rotor form the fulcrum point. Springs with motion distance limiter ensures a positive limit of the magnet travel wand a center resting position. The constant large contact area inducing maximum power generation. The properly weighted magnet is placed a desired distance above the water line to accomplish the desired motion. The wave powered generator is enclosed in a specially designed, hermetically sealed casing. Watertight panels cover the open access to the described device. The wave created motion of the casing will engage the unstable pendulum for electric current generation. The movement of the magnet is random in three-hundred and sixty degrees. The electricity generator can be reversed for a conventional pendulum but it is likely less effective. Other approaches to control distance travel and assist to find the central resting point. One spring is attached to the shaft below the pivoting shaft. Uses magnet force to control distal travel and central resting position. The shape and weight of the electro-mechanical generator determines the water line distance above the fulcrum point to the shaft. The produced electrical energy will be stored at the bottom of the vessel until ready for external use. The generator can be downsized for use in ships, automobiles, helmets or any moving device with non-linear motion.

Spherical shaped casing should be made of noncorrosive material. The electrical energy is stored in a battery or a capacitor. One shock absorbing spring is attached to the bottom below the end of the rumbling motion shat. A cable connected with a universal joint to the other end of the shock absorbing spring. The other end of the cable attached to the rumbling motion. The shaft and universal joint work together to provide dampening and limiting the travel of the shaft to ensure an obstruction free movement. The universal joint can be replaced with a ball joint. At the outside bottom of the casing an anchoring line TO secure the electricity generator to the mooring system can be used. Also, a cable leading from the inside of the casing to allow the retrieval of stored electrical energy. In one example, the platform inside the housing includes longitudinal ribs to increase strength. The random movement of the inverted pendulum exaggerates the motion of the casing and releases the potential energy of the stored resting inverted pendulum. Therefore, increasing the potential of harvestable electrical energy.

Frictionless, brushless electricity generator system may use neodymium magnets, a round service entry door that is triple sealed with bolts tightened for waterproof entry.

To control the swing and the travel limit of the magnet, the proper balance between eddy current breaking effect and the mass of the magnet needs to be obtained. This balance determines the electric energy performance and protects against excessive magnet travel. The magnet, shaft, and universal joint rests on well reinforced platform to support the weight and the stress that the magnet creates.

FIG. 1 is a diagram illustrating a new electro-mechanical generator system. The electro-mechanical generator includes a housing 1, an arched array of metal coils 2, one or more magnets 3, a magnet mount 4, an inverted pendulum 5, one or more dampers 6, an energy storage unit 7, a voltage regulator 8, a current rectifier circuit array 10, a universal joint 11, and an arched coil array of output pairs 12.

In operation, the housing is moved by a source of kinetic energy, such as an ocean wave, the bobbing of a ship in the water, the movement of vehicle, which in turn causes the magnet-inverted pendulum assembly to move. The movement of the magnet assembly is limited by the one or more dampers 6, the universal joint 11, and the housing 1. When the one or more magnets 3 move, the travel along side the arched array of metal coils 2. The movement of the magnet along side the arched array of metal coils induces an electrical current to flow through one or more of the metal coils. This method of induction converts kinetic energy of the moving magnet(s) and attached inverted pendulum to electric energy in the form of current flowing through a metal coil. Electric current output from the metal coils is then used to charge an energy source, such as a battery or a capacitor.

Given that the current flowing through the metal coils will vary depending upon the direction the magnet(s) are traveling relative to the metal coil, the output current needs to be rectified so to ensure that currents of either direction are properly applied to charge the energy storage device.

The terminals of the energy storage device may be coupled to a voltage regulator 8. The function of the voltage regulator 8 is maintain a steady voltage level at the output terminals of the electro-mechanical generator. As the currents flowing through the array of coils varies so does the voltage applied to the energy storage unit. The voltage regulator solves the problem of varying voltage so that the output can be safely used to power electrical devices that require a steady voltage power supply.

In the illustrated example, the damper(s) function to limit the rate and range of movement of the magnet attached to the inverted pendulum. Any of the dampers described below can be used as a damper in the present invention.

The purpose of the dampers is to control the travel of the inverted pendulum.

One of the most common types is the viscous damper, which uses a thick, fluid-like silicone or oil to absorb energy. Inside the damper, a piston moves through a sealed chamber filled with the viscous fluid. As the piston moves, the fluid resists this motion, generating heat and slowing down the movement. Viscous dampers are often used in automotive suspensions, rotating machinery, and seismic dampening systems in buildings and bridges. Their ability to provide consistent damping over a wide range of motion and frequencies makes them ideal for controlling both high and low-frequency vibrations.

Another widely used damper is the friction damper, which relies on the resistance generated by sliding friction between surfaces to dissipate energy. These dampers typically consist of metal or composite materials that slide against each other under pressure. As the components move, friction converts the mechanical energy into heat, reducing motion. Friction dampers are frequently used in structural engineering to limit vibrations in buildings and bridges, particularly in seismic zones, as they provide effective resistance against sudden, sharp movements caused by earthquakes or wind forces. However, friction dampers can wear out over time due to the constant contact of the sliding surfaces.

Hydraulic dampers operate similarly to viscous dampers but use hydraulic fluid to absorb energy. In these dampers, a piston moves through a fluid-filled chamber, and the fluid is forced through small orifices or valves. The restriction of the fluid flow creates resistance, which slows down the movement. Hydraulic dampers are extensively used in vehicle suspension systems, aircraft landing gear, and heavy machinery. These dampers are valued for their ability to handle large forces and for providing smooth, controlled damping across a wide range of motion. Hydraulic dampers can be tuned by adjusting the valve sizes, allowing for customizable damping characteristics.

Pneumatic dampers use compressed air or gas to absorb and dissipate energy. In these dampers, a piston compresses air within a sealed chamber, and the resistance from the compressed gas provides the damping effect. Pneumatic dampers are commonly found in industrial equipment, automation systems, and vehicle doors to provide smooth, controlled motion. One advantage of pneumatic dampers is their ability to self-adjust to varying loads, making them suitable for applications where the forces and speeds are not constant. However, they are typically less effective for high-energy dissipation compared to hydraulic or viscous dampers.

Magnetic dampers, also known as eddy current dampers, use electromagnetic fields to generate resistance to motion. In this type of damper, a conductor (such as a metal disc or plate) moves through a magnetic field, which induces eddy currents that generate a magnetic force opposing the motion. This force converts the kinetic energy into heat, providing a damping effect. Magnetic dampers are contactless, meaning there is no wear and tear on the components, making them highly durable. These dampers are commonly used in precision instruments, rotating machinery, and linear motion systems where frictionless operation is crucial. The greater the mass of the magnet(s) the greater the stopping force that is required to stop the magnet's movement. Accordingly, when larger more massive magnets are used, stronger eddy currents are necessary to provide sufficient magnet stopping force.

Inertia dampers, or tuned mass dampers (TMDs), work by attaching a mass to a system and allowing it to move in opposition to the vibrations or motion of the main structure. When vibrations occur, the inertia of the attached mass resists the motion, helping to stabilize the structure. Tuned mass dampers are frequently used in high-rise buildings, bridges, and skyscrapers to counteract wind or seismic vibrations. These dampers are precisely tuned to the natural frequency of the structure to provide the maximum damping effect.

In addition to mechanical damping, the generator may employ magnetic dampening. Magnetic damping between a magnet and a metal coil is a phenomenon that occurs when a moving magnet interacts with a conductive material, such as a metal coil, generating eddy currents that create an opposing magnetic field. This process effectively slows down the motion of the magnet, dissipating its kinetic energy as heat, and providing a damping effect without any physical contact. Magnetic damping relies on Faraday's Law of Induction, which states that a changing magnetic field induces an electric current in a conductor, and Lenz's Law, which explains that the induced current will create a magnetic field that opposes the change in the original magnetic field.

In the case of a magnet moving near a metal coil, as the magnet approaches the coil, the changing magnetic field induces a current in the coil. This induced current flows in such a direction that the magnetic field it produces opposes the motion of the magnet, creating a resistive force that slows the magnet's movement. The faster the magnet moves, the stronger the induced current and the greater the opposing force. This interaction between the magnet and the coil results in a smooth, non-contact damping effect. The damping force increases with the speed of the magnet, making magnetic damping highly effective for controlling oscillations and vibrations in systems where mechanical friction is undesirable or impractical.

One of the key advantages of magnetic damping is that it involves no physical wear or friction since the magnet and the coil do not make direct contact. This makes magnetic damping ideal for applications requiring low-maintenance, long-lasting solutions, such as in precision instruments, oscillating systems, or vibration isolation in sensitive equipment. The strength of the damping effect can be influenced by several factors, including the strength of the magnet, the conductivity of the coil material, the number of turns in the coil, and the distance between the magnet and the coil. Increasing the number of turns in the coil or using materials with higher electrical conductivity, such as copper or aluminum, can enhance the strength of the induced currents and, consequently, the damping force.

Moreover, the efficiency of magnetic damping can be enhanced by controlling the coil's electrical resistance. In some systems, resistors are added to the coil circuit to tune the amount of damping. By altering the resistance, the induced current and the opposing magnetic field can be adjusted, allowing for more precise control of the damping effect. In certain cases, coils are connected to external circuitry or feedback systems to adjust the damping dynamically based on the system's needs.

Magnetic damping between a magnet and a metal coil is a highly effective and non-contact method of dissipating kinetic energy through the generation of opposing magnetic fields via induced currents. This form of damping is widely used in applications where minimizing physical wear and achieving smooth, controllable damping is essential, making it an excellent choice for precision mechanical systems, vibration control, and electromagnetic braking systems.

With respect to the housing, many different types of materials may be used depending on the use case. When designing a housing for an electro-magnetic generator that will be exposed to harsh environments, such as floating in the middle of the ocean or attached to a vehicle in the desert, the choice of materials is critical to ensure durability, corrosion resistance, and mechanical strength. Several materials, including carbon fiber, stainless steel, aluminum alloys, and high-performance polymers, are commonly used in such applications due to their unique properties tailored to withstand these extreme conditions.

One of the most advanced materials for this purpose is carbon fiber, a lightweight, incredibly strong material known for its high strength-to-weight ratio and resistance to environmental degradation. Carbon fiber consists of fine strands of carbon woven together and embedded in a resin matrix. This material offers exceptional resistance to corrosion, which makes it particularly suitable for marine applications where exposure to saltwater can cause rapid deterioration in other materials. Additionally, carbon fiber's low weight makes it ideal for applications where minimizing weight is important, such as on a vehicle in the desert or for floating systems in the ocean. Its high stiffness and strength also ensure that the housing remains structurally intact despite the stresses of movement, vibration, and external forces, making it a top choice for protecting sensitive generator components.

Marine-grade stainless steel (typically 316 stainless steel) is another material commonly used for housings in ocean environments. This type of stainless steel is highly resistant to corrosion, especially in salty, wet conditions. The chromium content in stainless steel forms a passive oxide layer that prevents rust, while additional alloying elements like molybdenum enhance its resistance to pitting and crevice corrosion. Stainless steel is also incredibly durable and can withstand both physical impacts and the long-term effects of UV radiation, making it a great choice for generators subjected to both marine and desert environments. However, it is heavier than carbon fiber, which could be a disadvantage in applications where weight reduction is crucial.

Figure 2:
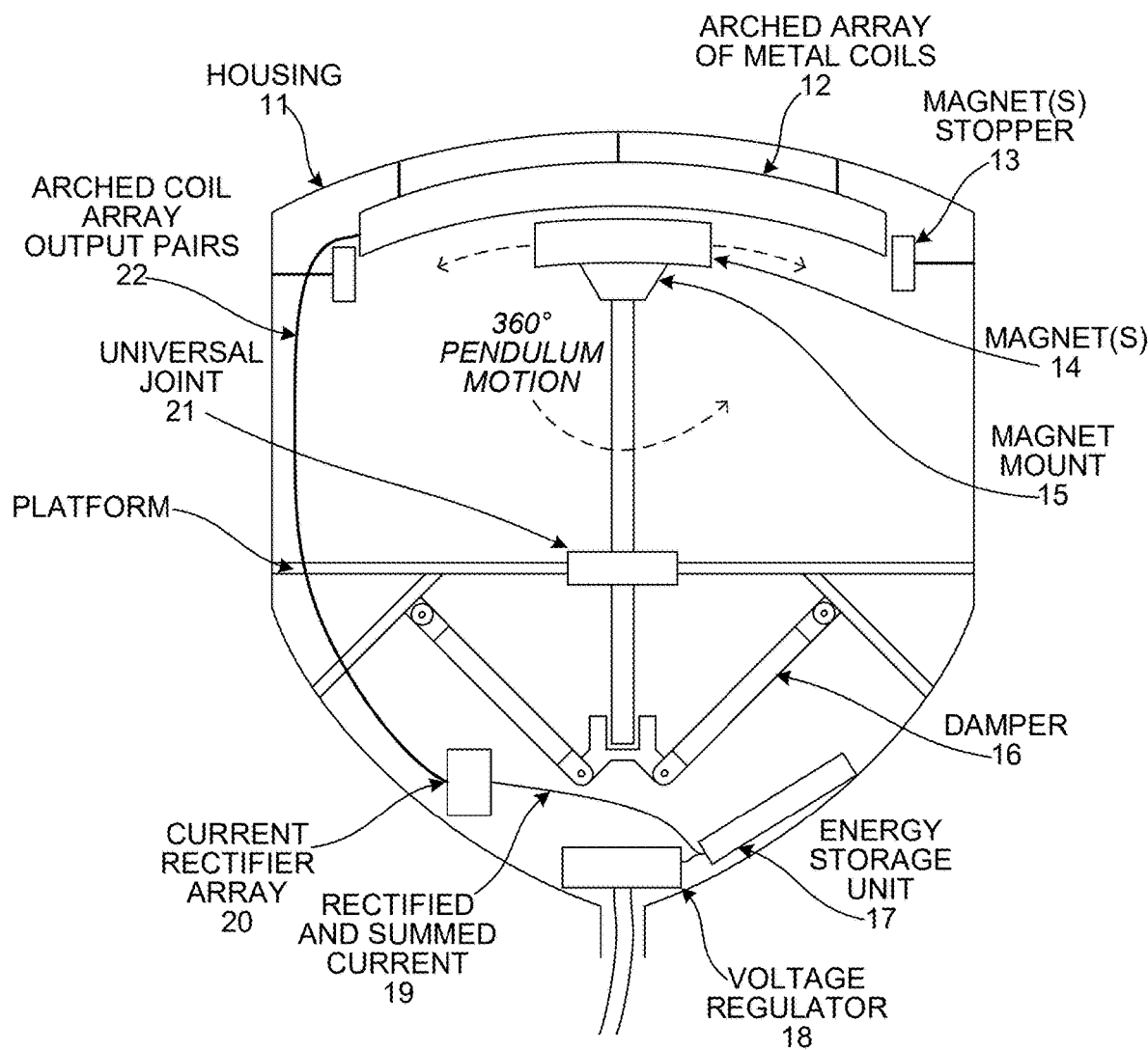
FIG. 2 is a diagram illustrating another new electro-mechanical generator system.
Figure 4:
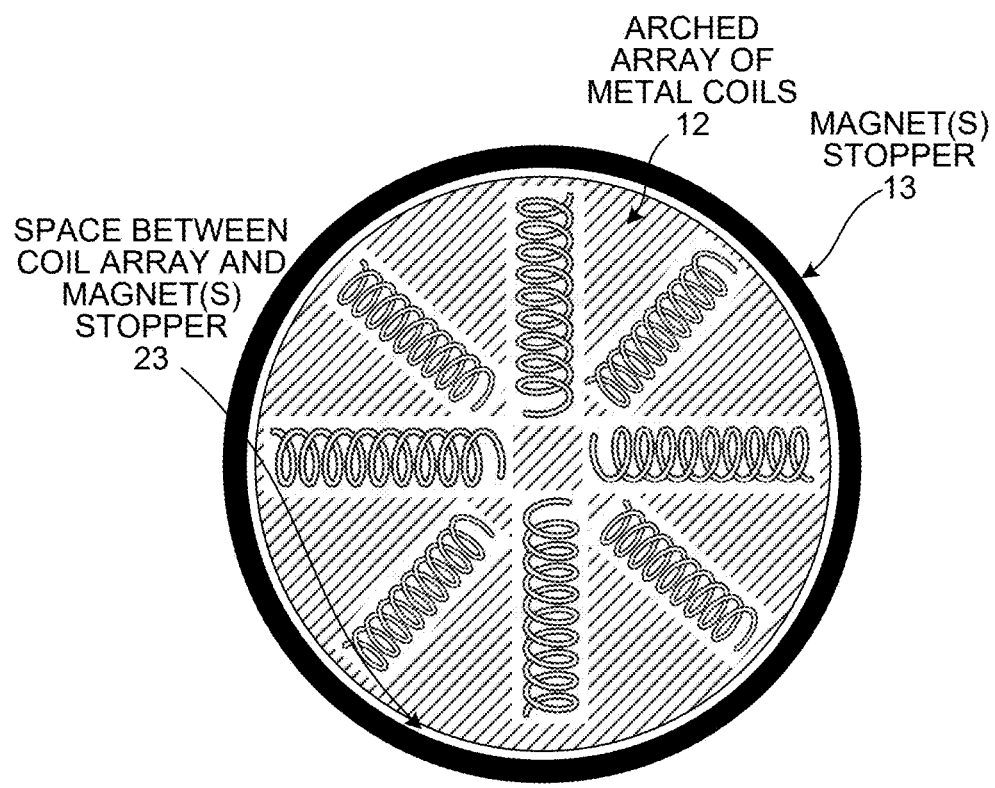
FIG. 4 is a diagram illustrating a top-down view of a coil array with a magnet stopper.
Figure 5:
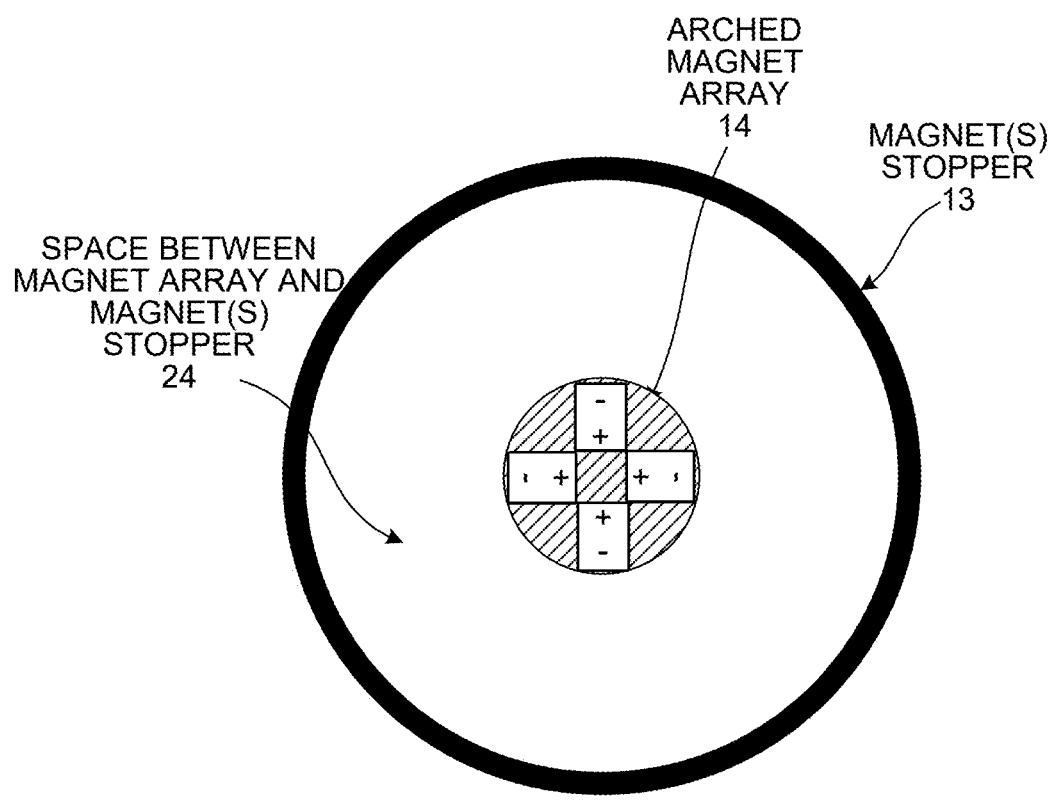
FIG. 5 is a diagram illustrating a bottom-up view of a magnet array with a magnet stopper.

FIG. 2 is a diagram illustrating another new electro-mechanical generator system. The electro-mechanical generator of FIG. 2 includes a magnet stopper 13 so to prevent the magnet connected to the end of the inverted pendulum from banging into the housing 11 when the inverted pendulum swings further than the arched array of metal coils 12. FIG. 4 is a diagram illustrating a top-down view of a coil array with a magnet stopper. FIG. 5 is a diagram illustrating a bottom-up view of a magnet array with a magnet stopper. In operation, the magnet swings past the arched array of metal coils to generate electric current in the coils; however, once the magnet has completely passed the arched array of metal coils, the magnet may still have enough kinetic energy to continue traveling toward the housing. In order to prevent the magnet from banging into the housing, the magnet stopper is installed to absorb the kinetic energy of the magnet and stop its travelling toward the housing wall. This configuration provides multiple benefits.

First, it protects the housing from repeated collisions that can cause damage to the housing wall over time.

Second, it protects the magnet from repeated high intensity collisions that can cause the magnet to crack or break over time.

Third, it increases the overall lifetime of the electro-mechanical generator by increasing the lifetime of the magnet and the housing.

Fourth, it decreases the amount noise created by the generator so to limit the impact on the surrounding wildlife that may be startled or repelled by loud noises.

Rubber materials, such as natural rubber, provide excellent elasticity and energy dissipation, making them ideal for moderate to high impacts, though they may degrade over time. Neoprene rubber offers additional resistance to environmental factors, such as heat and oxidation, making it suitable for varying conditions. Silicone rubber provides high flexibility and can withstand extreme temperatures, making it an excellent choice for environments with fluctuating conditions, though it can be more expensive.

Gel-based materials like silicone gel and polymer gel are also effective at absorbing impacts due to their ability to deform under pressure and slowly return to their original shape. These materials are highly effective for low-energy impacts and situations where delicate items, such as magnets, need protection. However, gel-based materials tend to be more costly and may not be as durable under high-impact conditions. Cork, as a natural material, offers good impact absorption and energy dispersion while being lightweight and sustainable. However, it can become brittle over time, making it less suitable for repeated high-impact use.

The choice of material for absorbing the impact of a swinging magnet will depend on the energy of the impact, the frequency of use, and the specific application.

The illustrated magnet stopper 13 is attached to the housing and positions around the perimeter of the arched array of metal coils; however, in another embodiment the magnetic stopper may be attached to the magnet and positioned around the perimeter of the magnet.

Figure 3:
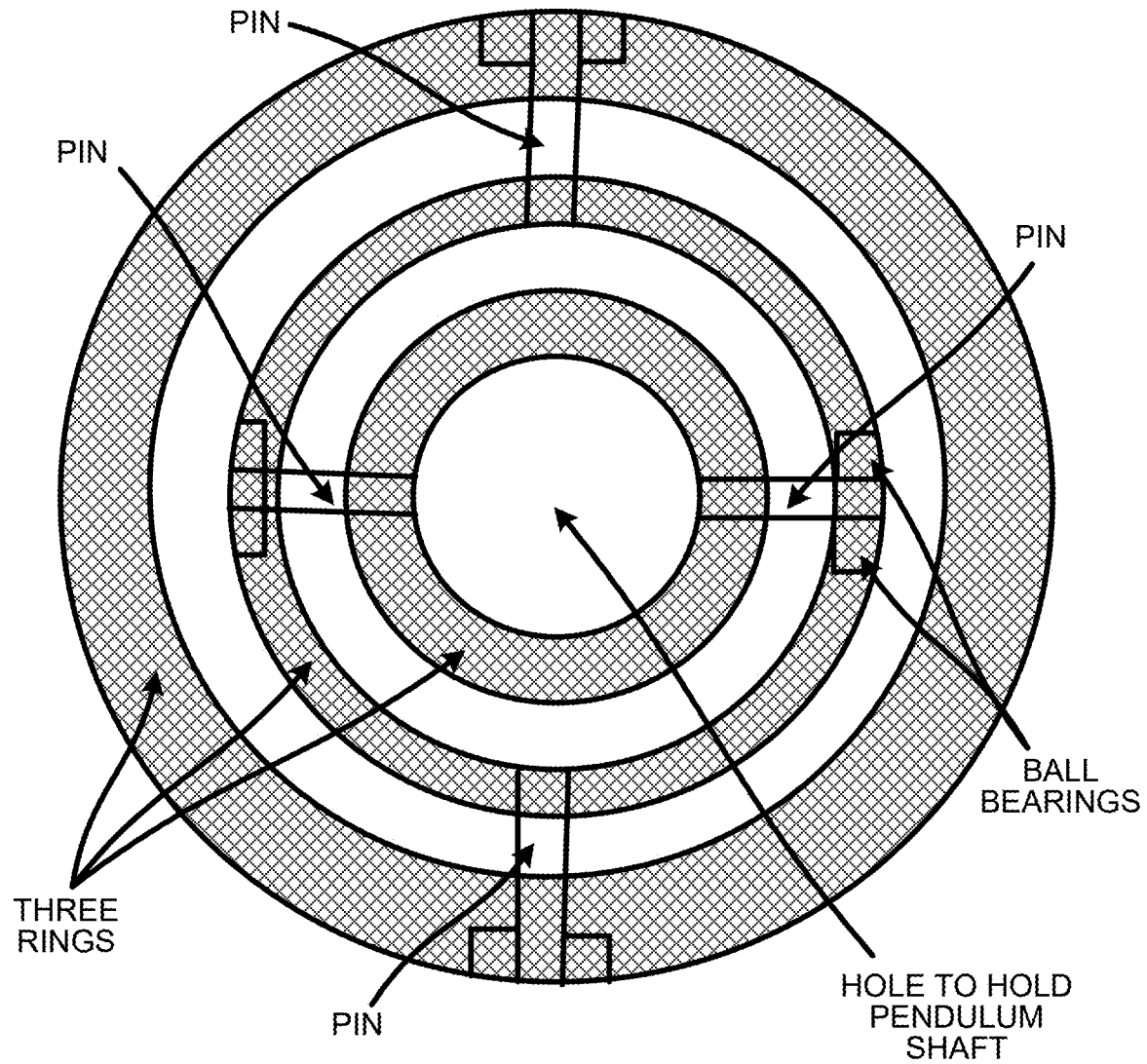
FIG. 3 is a diagram illustrating a universal joint.

FIG. 3 is a diagram illustrating a universal joint. Many different types of joints may be used to implement the desired functionality. For example, the universal joint shown in FIG. 3 may be used. Alternatively, any of the various universal joints described below may also be used depending on the application of the present invention.

Mechanical universal joints (U-joints) are flexible couplings used to allow rotary motion between shafts that are not in perfect alignment. They are common in various applications, from automotive driveshafts to industrial machinery. Several types of universal joints exist, each with distinct features and benefits tailored to specific mechanical needs.

To address the issue of velocity fluctuation, double universal joints are commonly used. A double universal joint consists of two single universal joints connected by an intermediate shaft, which allows for a wider range of angular motion (up to 90 degrees) while maintaining more uniform rotational speed between the input and output shafts.

Another variation is the constant velocity (CV) joint, which, as the name suggests, is designed to maintain constant rotational speed regardless of the angle between the shafts. There are several types of CV joints, including Rzeppa joints and ball and socket joints. The Rzeppa joint consists of a spherical housing with six ball bearings that transfer torque between the input and output shafts, even at extreme angles, making it ideal for front-wheel-drive cars where shafts must transmit power while turning. Ball and socket joints, another type of CV joint, work similarly by maintaining constant velocity through the use of a ball mechanism that allows for smooth and even torque transfer. CV joints are preferred for high-speed applications where uniform power transmission is critical.

The cross and roller universal joint is another type, where the traditional cross-shaped intermediate piece is replaced by rollers mounted on needle bearings. These rollers allow for smoother operation, reduced friction, and lower wear over time. Cross and roller joints are suitable for heavy-duty applications, such as in industrial machinery and high-torque environments, where durability and efficiency are essential.

Lastly, elastomeric universal joints incorporate a flexible elastomer (rubber or polyurethane) between the yokes, providing a cushioning effect that reduces vibration and noise while still allowing for angular misalignment. These joints are used in applications where smooth, quiet operation is critical, such as in light industrial machinery or precision equipment.

Figure 6:
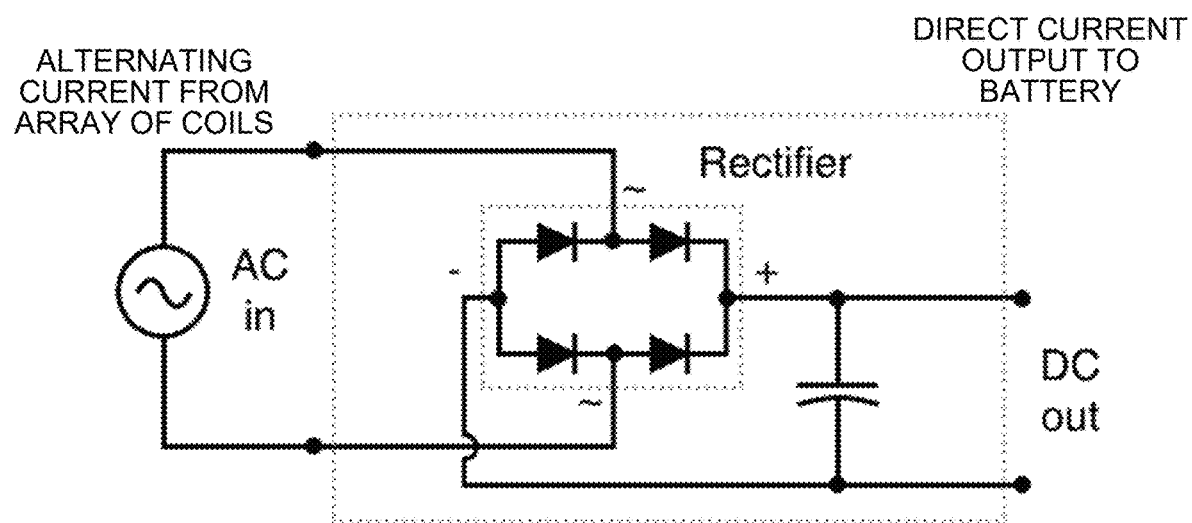
FIG. 6 is a diagram illustrating a current rectifier circuit diagram.

FIG. 6 is a diagram illustrating a current rectifier circuit diagram. A current rectifier circuit is an electrical circuit designed to convert alternating current (AC), which periodically reverses direction, into direct current (DC), which flows in only one direction. Rectifiers are commonly used in power supplies to provide stable DC voltage for electronic devices, as many systems, such as batteries and electronic components, require DC to function. The basic working principle of a rectifier relies on diodes, which are semiconductor devices that allow current to flow in only one direction.

In a simple half-wave rectifier, a single diode is placed in series with an AC input. When the AC input is positive, the diode becomes forward-biased, allowing current to pass through the circuit and delivering current to the load. When the AC input becomes negative, the diode becomes reverse-biased, blocking the current. As a result, only the positive half of the AC waveform is allowed through, while the negative half is cut off, producing a pulsating DC output. While half-wave rectification is simple, it is inefficient because it uses only half of the AC waveform, resulting in lower power output.

A more efficient approach is the full-wave rectifier, which uses either a center-tapped transformer and two diodes or a bridge rectifier configuration with four diodes. In a full-wave rectifier, both the positive and negative halves of the AC waveform are utilized. For a center-tapped transformer design, one diode conducts during the positive half-cycle, and the other conducts during the negative half-cycle, flipping the negative half to the positive side. In the bridge rectifier configuration, the four diodes are arranged in such a way that during both the positive and negative half-cycles of the AC input, current is directed in the same direction through the load. This allows the circuit to produce a continuous series of positive pulses, effectively converting the entire AC waveform into pulsating DC.

While the output of a rectifier is technically DC, it is still a pulsating waveform with fluctuations corresponding to the peaks of the AC input. To smooth this output and produce a more stable DC signal, a filter is often added to the rectifier circuit. A common filter is a capacitor, which charges during the peaks of the rectified waveform and discharges during the valleys, reducing the amplitude of the voltage ripples and providing a steadier output. Additional filtering techniques, such as using inductors or more complex filters, can further smooth the DC output.

A current rectifier circuit works by using diodes to block the reverse flow of current, converting alternating current (AC) into direct current (DC). Half-wave rectifiers use a single diode to pass only the positive half of the AC waveform, while full-wave rectifiers, particularly bridge rectifiers, use multiple diodes to utilize both halves of the AC waveform, producing a more efficient conversion. Filters are then employed to smooth the output, resulting in a stable DC supply suitable for powering electronic devices.

Figure 7:
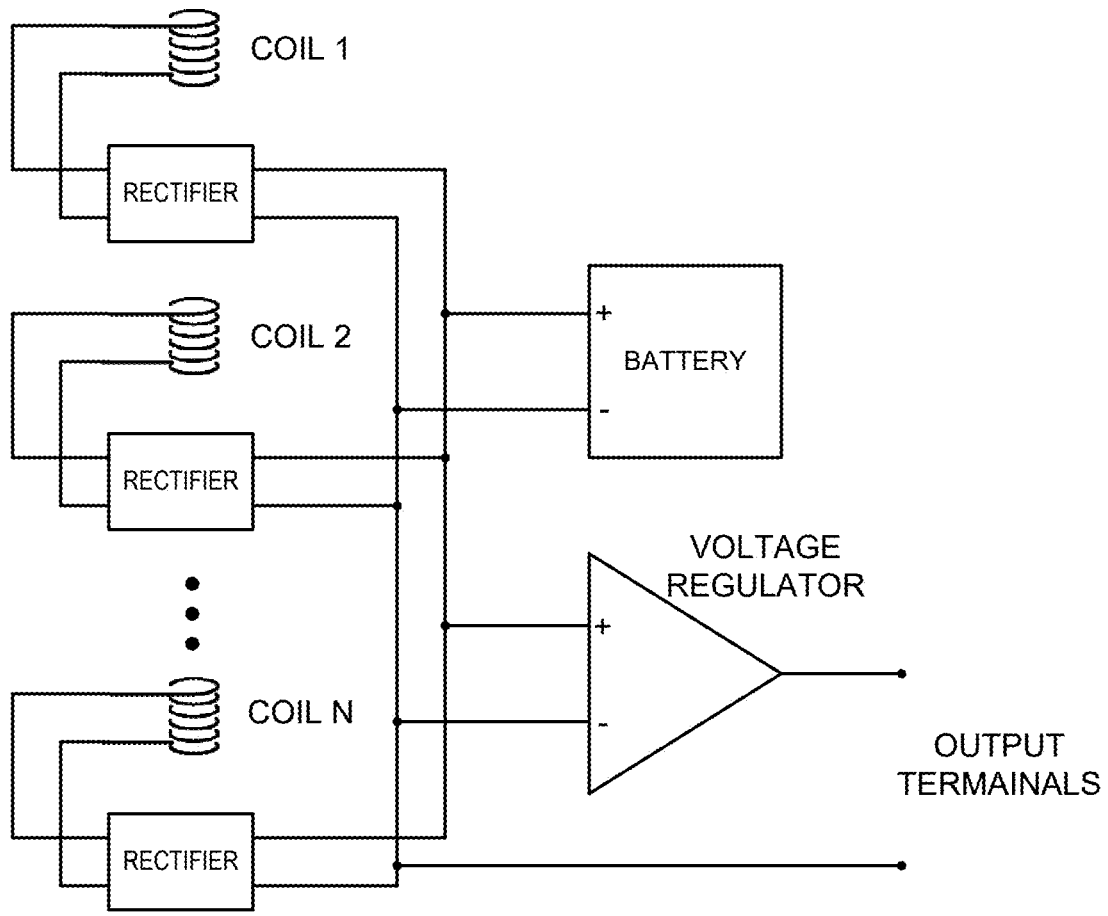
FIG. 7 is a diagram illustrating a system electrical diagram of the electro-mechanical generator system.

FIG. 7 is a diagram illustrating a system electrical diagram of the electro-mechanical generator system. Each coil in the arched array of metal coils are coupled to a dedicated current rectifier circuit. The output current from each current rectifier circuit is summed together to generate a summed output current. The summed output current is then coupled to an energy storage device, such as a battery, to store the energy for future use. The energy storage device is then coupled to a voltage regulator to ensure a consistent output voltage is applied to the output terminals of the system.

Figure 8:
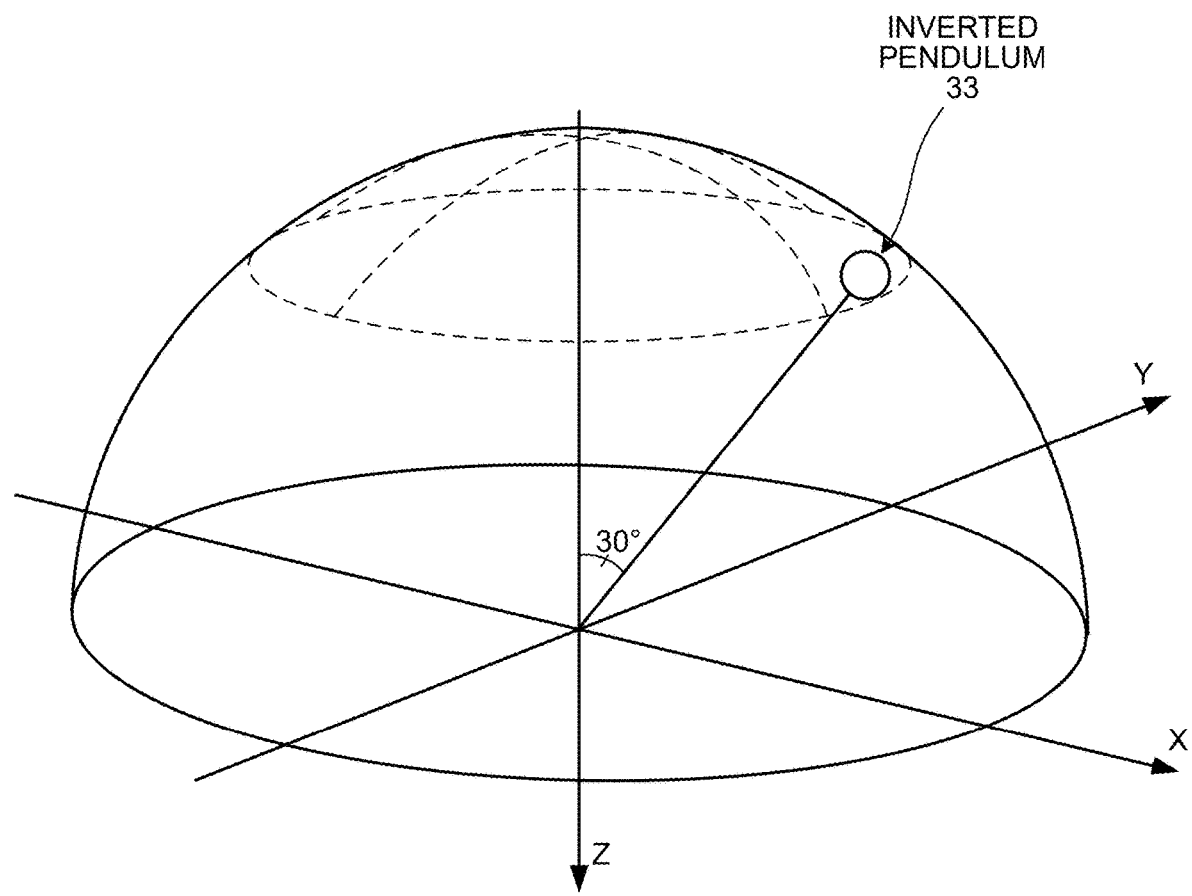
FIG. 8 is a diagram illustrating the range of motion of a magnet attached to an inverted pendulum in the electro-mechanical generator system.

FIG. 8 is a diagram illustrating the range of motion of a magnet attached to an inverted pendulum in the electro-mechanical generator system. The range of motion of the inverted pendulum can vary depending on the geometry of the implementation. The generic range of motion of an inverted pendulum moving above a flat surface is illustrated in FIG. 8. This illustration gives the reader an understanding as to the natural movement of the inverted pendulum described herein.

Figure 9:
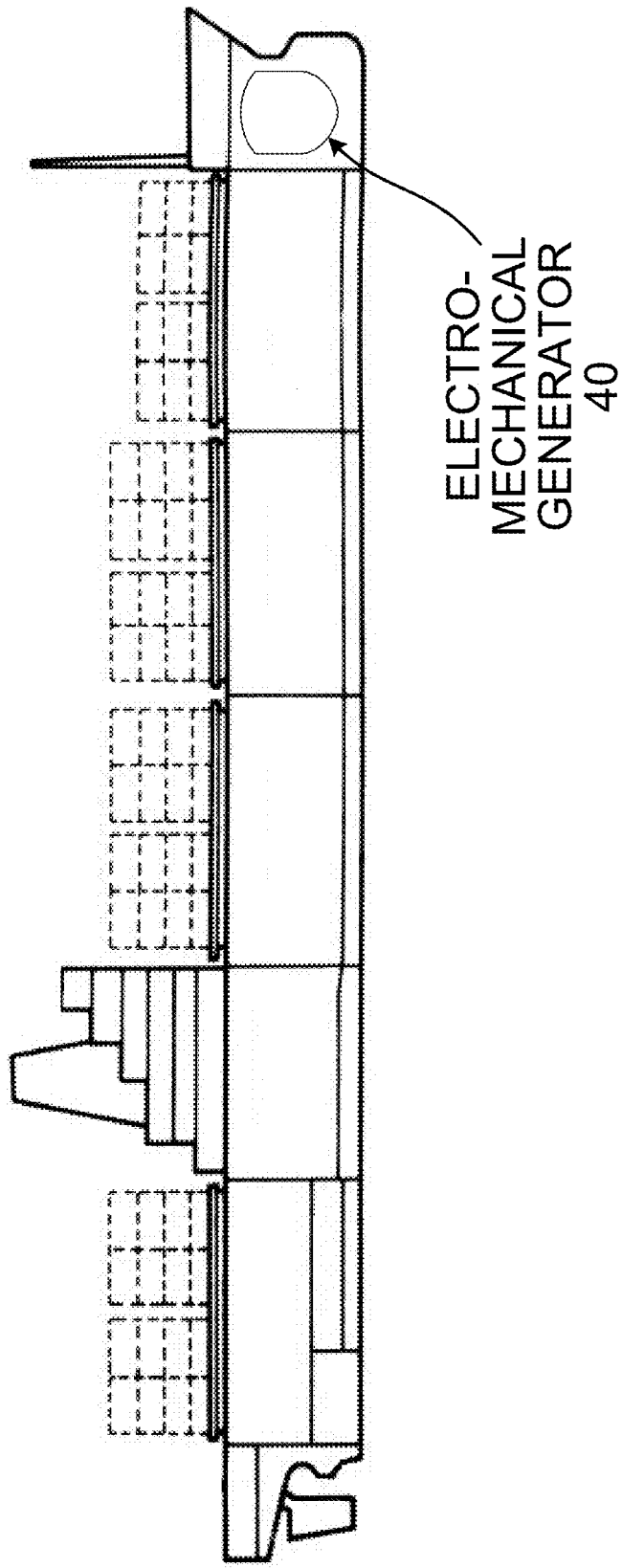
FIG. 9 is a diagram illustrating an exemplary use of the electro-mechanical generator on a shipping vessel.

FIG. 9 is a diagram illustrating an exemplary use of the electro-mechanical generator on a shipping vessel. In this example, an electro-mechanical generator is installed in the bow of a ship to harness the ship's motion, particularly as it moves through rough seas or waves, to generate electrical energy. This generator works on the principle of electro-magnetic induction, where mechanical energy from the ship's movement is converted into electrical energy that can be used to power onboard systems or stored in batteries. The generator is positioned in the bow because this area of the ship experiences the most significant motion, especially when the ship pitches forward and backward as it navigates waves.

The generator consists of a magnetic and one or more coils of wire (stator). As the ship moves, the mechanical forces cause the magnet inside the generator to move. This movement induces a changing magnetic field in the coil, which in turn generates an electric current based on Faraday's Law of Induction. The amount of electrical energy produced by the generator is directly proportional to the rate of change of the magnetic field and, consequently, the speed of the magnet's movement. When the ship experiences greater movement, such as when it hits larger waves or during rough seas, the magnet moves faster, resulting in a greater amount of electrical energy being produced.

For instance, as the ship pitches upward when encountering a large wave, the generator's magnet accelerates due to the increased mechanical force from the ship's motion. This acceleration increases the rate of change of the magnetic field, leading to a higher voltage and greater current being induced in the coil. Conversely, when the seas are calm and the ship experiences less movement, the magnet moves more slowly, and the amount of electrical energy generated is reduced. The system is designed to take advantage of the ship's natural movements, with the generator converting this kinetic energy into a usable electrical supply for the ship's systems, such as lighting, communications equipment, or auxiliary systems.

Additionally, the generator can be equipped with energy storage devices, such as batteries or capacitors, which store excess energy generated during periods of intense movement, ensuring that power is available even when the ship's motion decreases. This setup is particularly valuable for vessels operating in remote areas or during long voyages where reliable and sustainable energy sources are crucial.

In summary, the greater the physical movement of the ship, particularly in the bow where motion is most pronounced, the greater the mechanical input to the generator, resulting in the production of more electrical energy. This system not only enhances the energy efficiency of the ship but also reduces reliance on traditional fuel-based power generation, contributing to a more sustainable and energy-resilient vessel.

The present invention can also be used in many other scenarios. For example, the disclosed electro-magnet generator can be used on a helmet to generate electricity to power a head lamp for illumination. In this scenario, an electro-magnetic generator is integrated into a helmet that powers a headlamp for night vision. The generator is designed to convert the mechanical movements of the wearer's head into electrical energy, which can then be used to power the headlamp. The generator operates on the principle of electromagnetic induction, where mechanical energy from head movements is transformed into electrical energy. As the user moves their head—whether walking, running, or performing other activities—the generator's magnet moves near a coil of wire (stator), inducing an electric current. This current is used to power the headlamp, providing consistent illumination in low-light conditions.

The more significant and frequent the head movements, the greater the amount of electrical energy generated. For example, when the wearer turns or nods their head quickly, the increased mechanical force causes the magnet to move faster, producing a stronger magnetic field and, in turn, generating more electricity. During periods of minimal head movement, such as when the wearer is stationary, the magnet moves more slowly, and the output of electrical energy decreases. However, the generator can be designed to include energy storage, such as a small battery or capacitor, which stores excess energy generated during more vigorous movements. This ensures that the headlamp remains powered even during brief periods of stillness.

This system provides a sustainable, on-demand power source for the headlamp, eliminating the need for external batteries or frequent recharging. It is particularly useful for outdoor enthusiasts, military personnel, or workers in low-light environments, where consistent lighting is essential, and relying on traditional power sources may be impractical. The integration of the electro-magnetic generator in the helmet allows for hands-free operation while ensuring that the energy needed to power the headlamp is readily available through the natural movements of the user.

Figure 10:
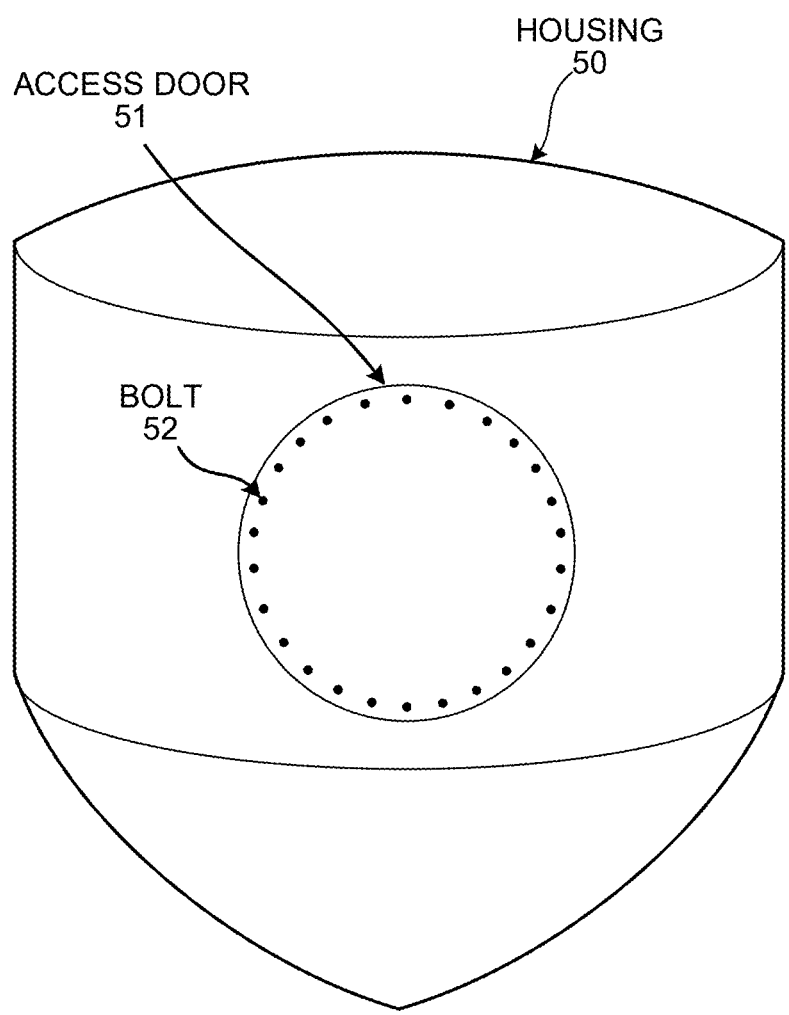
FIG. 10 is a diagram illustrating an access door on the electro-mechanical generator.

FIG. 10 is a diagram illustrating an access door on the electro-mechanical generator. A watertight door for an electro-magnetic generator designed to function in extreme environments, such as floating in the middle of the ocean or attached to a vehicle in the desert, must offer superior protection against water, dust, and environmental stress. This type of door would typically be constructed from marine-grade stainless steel (such as 316 stainless steel) or aluminum alloys, both known for their excellent resistance to corrosion from saltwater and extreme temperatures. The door would need to be robust enough to withstand both high pressures from ocean water and harsh desert conditions while providing an airtight and watertight seal to protect the sensitive internal components of the generator.

The sealing mechanism would use high-performance gaskets, such as neoprene or EPDM rubber seals, which are resistant to saltwater, UV exposure, and extreme temperatures. These materials offer excellent flexibility, allowing the door to create a hermetic seal when closed, preventing water ingress in the ocean environment or dust infiltration in desert conditions. Additionally, the seal would need to perform effectively under temperature fluctuations, maintaining integrity during exposure to the hot sun in a desert or the cold waters of the ocean.

To further enhance its performance in desert conditions, the door might incorporate thermal insulation materials like ceramic fiber or high-temperature silicone foam to protect the generator from extreme heat. The door's exterior could be coated with UV-resistant paint or anodized aluminum finishes to prevent sun damage, ensuring longevity even under prolonged sun exposure.

Overall, the watertight door would be meticulously designed to withstand the specific challenges of both ocean and desert environments. By utilizing corrosion-resistant metals, self-lubricating hinges, and secure locking mechanisms, the door would ensure that the electro-magnetic generator remains well-protected, ensuring efficient performance and durability in even the harshest of conditions.

Figure 11:
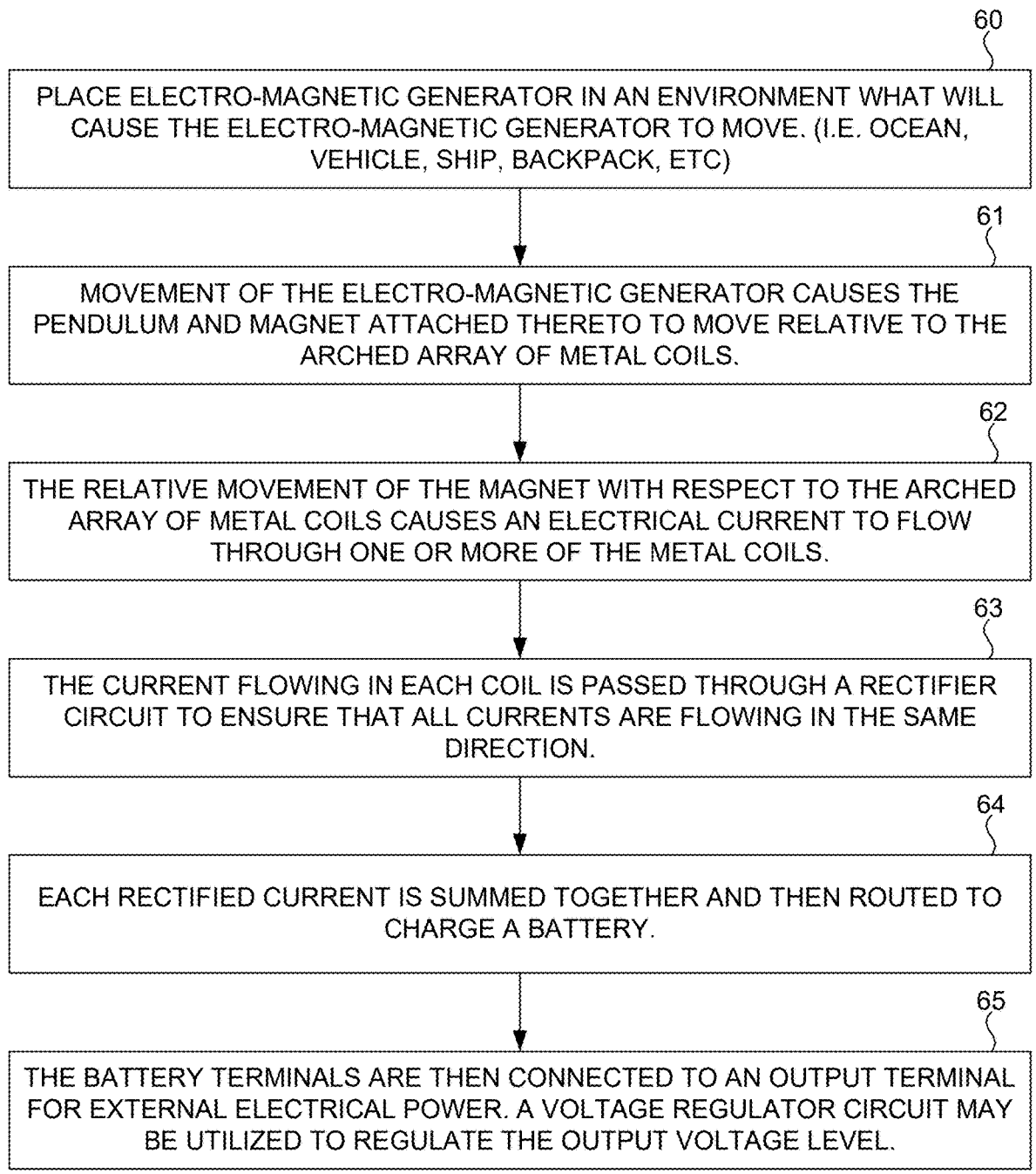
FIG. 11 is a flowchart describing the operation of the electro-mechanical generator.

FIG. 11 is a flowchart describing the operation of the electro-mechanical generator. In the first step 60, an electro-magnetic generator is placed in an environment that will cause the electro-magnetic generator to move. This involves positioning the generator in a location where movement can be induced by the environment, such as in a body of water, on a moving vehicle, or within a portable object like a backpack. In step 61, movement of the electro-magnetic generator causes the inverted pendulum and magnet attached thereto to move relative to the arched array of metal coils. In step 62, the relative movement of the magnet with respect to the arched array of metal coils causes an electrical current to flow through one or more of the metal coils. In step 63, the current flowing in each coil is passed through a rectifier circuit to ensure that all currents are flowing in the same direction. In step 64, each rectified current is summed together and then routed to charge a battery. In step 65, the battery terminals are then connected to an output terminal for external electrical power. A voltage regulator circuit may be utilized to regulate the output voltage level This step-by-step process describes how the electro-magnetic generator operates, converts mechanical movement into electrical energy, and prepares that energy for use in external systems.

Figure 12:
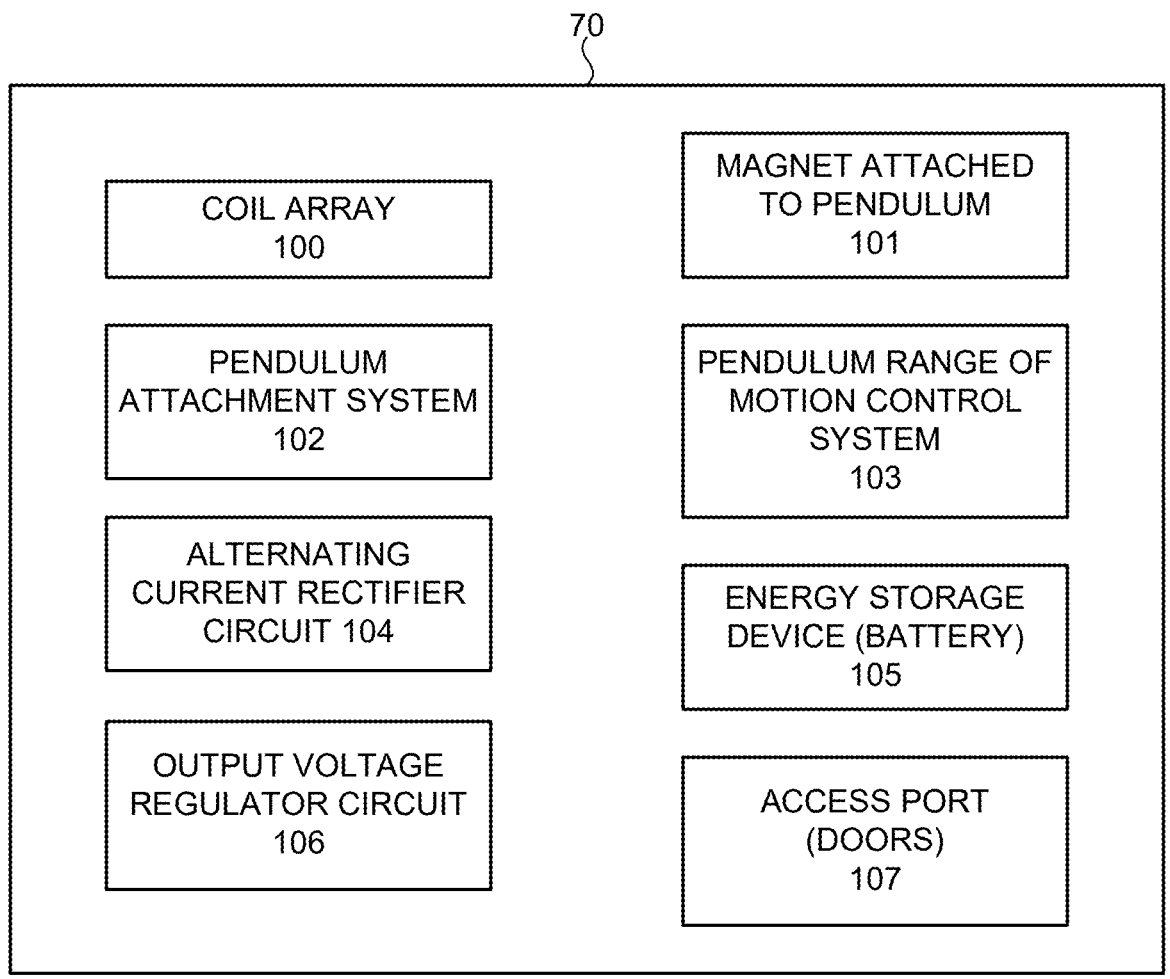
FIG. 12 is a system diagram of an electro-mechanical generator.

FIG. 12 is a system diagram of an electro-mechanical generator. As described in more detail above, the electro-mechanical generator may include a coil array 100, a magnet attached to an inverted pendulum 101, a inverted pendulum attachment system 102, an inverted pendulum range of motion control system 103, an alternating current rectifier circuit 104, an energy storage device 105, an output voltage regulator circuit 106, and an access port 107.

Figure 13:
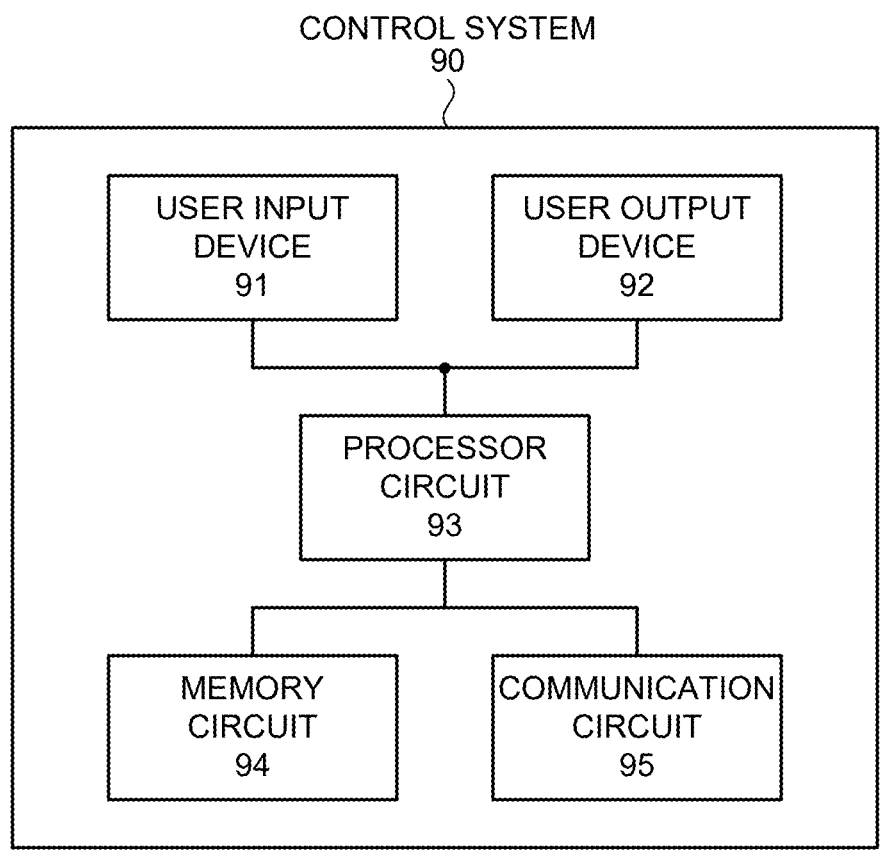
FIG. 13 is a system diagram of an electronic control system configured to control the operation of the electro-mechanical generator.

FIG. 13 is a system diagram of an electronic control system configured to control the operation of the electro-mechanical generator. In one embodiment, the electronic control system includes a user input device 91, such as a keyboard, touch screen, a user output device 92, such as a display, speaker or light, a processor circuit 93 capable of processing instructions and data, a memory circuit 94 capable of store data, and a communication circuit 95 capable of sending and receiving wired or wireless communication signals.

An electro-magnetic generator may utilize a communication control system to optimize its operation, ensure reliability, and facilitate remote monitoring and management, particularly in dynamic or remote environments such as on a ship, vehicle, or in portable applications. A communication control system plays a crucial role in allowing the generator to communicate with external devices or centralized control centers, making real-time adjustments based on operational conditions, and ensuring smooth integration with other electrical systems.

One of the primary reasons for incorporating a communication control system is real-time performance monitoring. As the generator operates, environmental conditions such as movement speed, load demands, or temperature fluctuations can significantly impact its performance. The communication control system enables continuous monitoring of key parameters like voltage, current, magnet speed, and energy output. By processing and transmitting this data, the system provides feedback to operators, allowing for immediate adjustments to maximize efficiency. This is especially important in applications where energy demands fluctuate, or when the generator must operate at peak efficiency in varying conditions.

The communication control system also facilitates power regulation and load balancing. In scenarios where the electro-magnetic generator is integrated into a larger power system, such as a ship or a remote facility, the control system can manage the power flow between the generator and other components of the electrical grid. It ensures that the generator's output matches the energy needs of the connected systems, preventing overloading or underutilization. By dynamically adjusting the generator's performance, the control system helps maintain a stable power supply, reduces energy waste, and improves overall system efficiency.

Remote control and diagnostics is another critical function of the communication control system. In situations where the generator is installed in a remote or harsh environment—such as in the middle of the ocean or on a desert vehicle—access for maintenance and adjustments may be difficult or impractical. The communication control system allows operators to remotely monitor the generator's status, diagnose any potential issues, and even adjust operational settings from a distance. This capability not only reduces the need for on-site personnel but also ensures that the generator remains operational without the need for frequent maintenance trips, which can be costly and time-consuming.

Furthermore, the communication control system can improve energy storage management. Electro-magnetic generators often store excess energy in batteries or capacitors, and efficient energy management is critical for ensuring the longevity and performance of these storage systems. The control system can monitor the state of charge in the batteries, regulate the charging process, and prevent issues like overcharging or discharging that could degrade the battery's lifespan. By intelligently managing the flow of electricity from the generator to the storage system, the communication control system enhances overall system reliability and ensures that stored energy is available when needed.

Lastly, the communication control system contributes to fault detection and safety management. If the generator experiences operational anomalies, such as power surges, mechanical failures, or electrical short circuits, the system can detect these issues in real-time and automatically initiate protective measures. This could include shutting down the generator, disconnecting it from the load, or sending alerts to operators. This functionality is crucial for preventing damage to both the generator and connected equipment, ultimately enhancing the system's longevity and reliability.

In summary, the communication control system in an electro-magnetic generator enables real-time performance monitoring, remote diagnostics, efficient power regulation, and energy storage management. These capabilities not only optimize the generator's operation but also ensure reliability, safety, and seamless integration into larger electrical systems, especially in remote or demanding environments.

Figure 14:
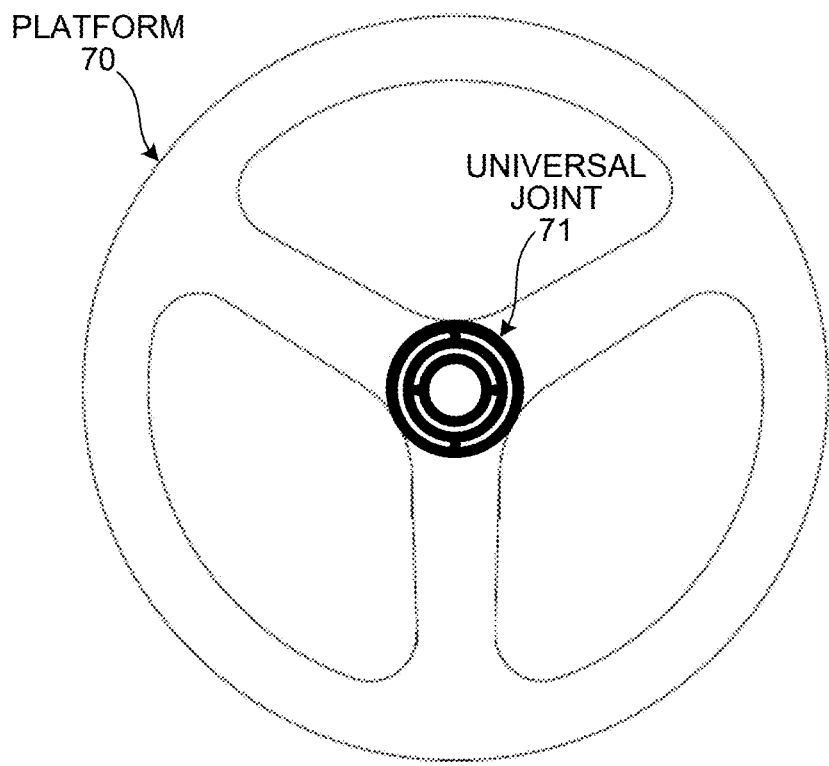
FIG. 14 is a diagram illustrating a platform configured to house a universal joint from a top-down view.
Figure 15:
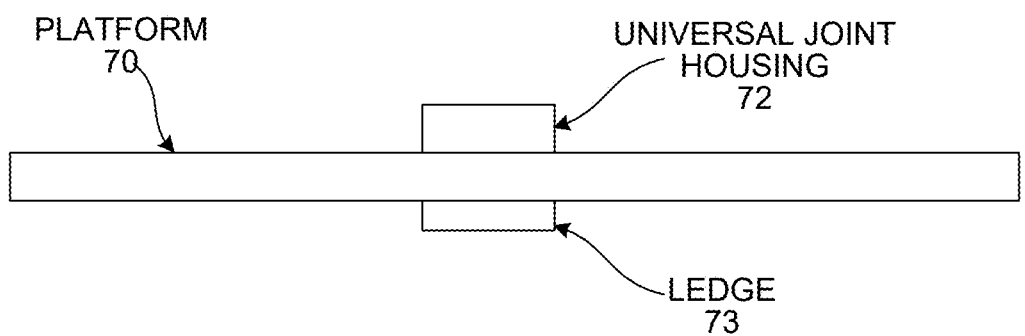
FIG. 15 is a diagram illustrating a platform configured to house a universal joint from a side view.

FIG. 14 is a diagram illustrating a platform configured to house a universal joint from a top-down view. FIG. 15 is a diagram illustrating a platform configured to house a universal joint from a side view. The platform 70 has a circular shape with three support spokes that connect to the center of the platform. At the center of the platform is a universal joint housing and ledge. The ledge provides support for the universal joint. The universal joint housing provides support for a universal joint that is configured to connect to an inverted pendulum shaft. The platform 70 may be constructed using any of the materials mentioned herein. In one example, the platforms rests on a ledge that extends from the interior surface of the house.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An electro-magnetic generator comprising:
   a housing;
   an arched array of metal coils disposed within the housing;
   a magnet connected to an inverted pendulum; and
   a universal joint, wherein the pendulum is connected to the housing, at least in part, via the universal joint, wherein the inverted pendulum configured to move the magnet about the bottom surface of the arched array of metal coils; and wherein the movement of the magnet relative to the arched array of metal coils generates an electrical current in one or more of the metal coils.

2. The electro-magnetic generator of claim 1, wherein the output of each coil in the arched array of metal coils includes a first terminal and a second terminal.

3. The electro-magnetic generator of claim 2, further comprising a plurality of current rectifier circuits, each rectifier circuit is connected the first terminal and second terminal of one of the metal coils.

4. The electro-magnetic generator of claim 3, wherein the output of each current rectifier circuit is summed together.

5. The electro-magnetic generator of claim 4, wherein the summed current is coupled to a battery terminal.

6. The electro-magnetic generator of claim 5, further comprising a voltage regulator connected to the terminal of the battery.

7. The electro-magnetic generator of claim 6, wherein the output of the voltage regulator is coupled to a pair of output electrical terminals.

8. The electro-magnetic generator of claim 5, wherein the battery is a rechargeable battery.

9. The electro-magnetic generator of claim 1, further comprising one or more dampers attached to an end of the inverted pendulum opposite the magnet, wherein the one or more dampers are configured to limit the motion of the inverted pendulum and the magnet attached thereon.

10. The electro-magnet generator of claim 9, wherein one of the one or more dampers is a metal spring.

11. The electro-magnet generator of claim 9, wherein one of the one or more dampers is an elastomer spring.

12. The electro-magnet generator of claim 9, wherein one of the one or more dampers is a pneumatic cylinder.

13. The electro-magnet generator of claim 9, wherein one of the one or more dampers is a hydraulic damper.

14. The electro-magnet generator of claim 9, wherein one of the one or more dampers is a gas spring.

15. The electro-magnet generator of claim 9, wherein one of the one or more dampers is a torsion bar.

16. The electro-magnet generator of claim 9, wherein one of the one or more dampers is a cable.

17. The electro-magnetic generator of claim 1, further comprising:
    a magnet stopper configured to limit the range of which the magnet can travel.

18. The electro-magnetic generator of claim 17, wherein the magnet stopper is made of a rubber material.

19. The electro-magnetic generator of claim 18, wherein the magnet stopper is made of a carbon fiber material.

20. The electro-magnetic generator of claim 1, wherein the inverted pendulum is configured to move in response to an external force applied to the housing.

* * * * *